United States Patent [19]

Stinson et al.

[11] 3,969,483

[45] July 13, 1976

[54] REMOVAL OF CARBONACEOUS MATTER FROM AMMONIUM POLYPHOSPHATE LIQUIDS

[75] Inventors: John M. Stinson, Sheffield; Horace C. Mann, Jr., Florence, both of Ala.; Dale H. Johnson, Downers Grove, Ill.

[73] Assignees: Tennessee Valley Authority, Muscle Shoals, Ala.; Akzona Incorporated, Ashville, N.C.

[22] Filed: June 5, 1975

[21] Appl. No.: 583,873

Related U.S. Application Data

[63] Continuation of Ser. No. 521,752, Nov. 7, 1974, Pat. No. T942,007.

[52] U.S. Cl. .............................. 423/305; 423/321 S
[51] Int. Cl.² .................. C01B 15/16; C01B 25/26
[58] Field of Search ................ 423/305, 321 S, 321

[56] References Cited
UNITED STATES PATENTS 3,367,749   2/1968   Koerner et al. ................. 423/321 S
3,458,282   7/1969   Koerner et al. ................. 423/321 S
3,630,711   12/1971  Burkert et al. ................. 423/302 X

*Primary Examiner*—Oscar R. Vertiz
*Assistant Examiner*—Gregory A. Heller
*Attorney, Agent, or Firm*—Robert A. Petrusek

[57] ABSTRACT

Particulate carbonaceous matter in ammonium polyphosphate liquid made from impure wet-process phosphoric acid is removed by intimately mixing the liquid with a combination of selected organic flocculating agents and then transferring the mixture to a separation vessel where the particulate carbonaceous matter floats rapidly to the surface. Clarified liquid that contains essentially no particulate carbonaceous matter is withdrawn from the bottom of the separation vessel. The particulate carbonaceous matter and a minor portion of the input ammonium polyphosphate liquid are withdrawn from the top of the separation vessel and processed into fluid or solid fertilizers.

10 Claims, 8 Drawing Figures

REMOVAL OF CARBONACEOUS MATTER FROM AMMONIUM POLYPHOSPHATE LIQUIDS

The invention herein described may be manufactured and used by or for the Government for governmental purposes without the payment to us of any royalty therefor.

This application is a continuation of application Ser. No. 521,752, filed Nov. 7, 1974, for REMOVAL OF CARBONACEOUS MATTER FROM AMMONIUM POLYPHOSPHATE LIQUIDS now Defensive Publication No. T942,007, issued Jan. 6, 1976.

Our invention relates to a method for the removal of particulate carbonaceous matter from ammonium polyphosphate liquids made from impure wet-process phosphoric acids. More particularly it relates to a new and improved method for clarification of ammonium polyphosphate liquids that involves flocculation of particulate carbonaceous matter to yield clear liquids; the particulate carbonaceous matter and a minor portion of the input ammonium polyphosphate liquids are recovered as a byproduct and processed into fluid or solid fertilizers. Still more particularly our invention relates to the utilization of commercially available and relatively inexpensive organic compounds for the flocculation of the particulate carbonaceous matter in ammonium polyphosphate liquids.

The method for production of phosphoric acid commonly practiced by the fertilizer industry, and referred to as the "wet-process," involves reaction of impure phosphate rock with sulfuric acid. The reaction mixture is filtered to remove calcium sulfate and yields a very impure phosphoric acid that contains a wide variety of impurities. The acid has a concentration of about 30 percent $P_2O_5$ (filter-grade acid) when produced and is usually concentrated to a $P_2O_5$ content of about 54 percent (merchant-grade acid) prior to shipment. This concentration has the effect of increasing the proportion of impurities that are present.

The impurities in wet-process acid vary depending principally upon the composition of the phosphate rock used. Calcium sulfate and various compounds of iron, aluminum, magnesium, and fluorine are the most prevalent impurities. Organic compounds also are present; these comprise organic materials originally present in phosphate rock and organic chemicals used in beneficiation of the rock prior to acid extraction. A portion of the impurities is present in solid form and a portion of the impurities is soluble in the acid. Impurities precipitate from the acid during storage and transportation to the user.

The most prevalent form of rock used in this country in the production of wet-process acid is mined in Florida. The rock is not now calcined prior to extraction and merchant-grade acid made from uncalcined rock is dark in color, often black, due to the presence of soluble and insoluble organic compounds. Calcination is costly and not suitable from the standpoint of conservation of energy since an expenditure of about 3 million Btu per ton of $P_2O_5$ is required.

Liquid mixed fertilizers having compositions similar to those of standard dry mixed fertilizers are well known in the industry and are increasing in popularity. Such solutions have the advantages over dry mixed fertilizers in that costs of evaporating water and bagging are eliminated and application to the soil is greatly simplified. Moreover, the use of liquid fertilizers eliminates difficulty due to segregation and caking often encountered in the storing of dry fertilizers.

However, liquid fertilizers that contain all of their phosphorus values as ortho acyclic species have some outstanding disadvantages. The solutions are limited to a maximum plant food content of about 33 percent by weight because experience has taught that concentration in excess of this amount always has resulted in crystallization and precipitation of soluble salts. Furthermore, liquids that contain all of their phosphorus values as ortho acyclic species derived from phosphoric acid of the wet-process type contain precipitated metallic impurities originally present in said wet-process phosphoric acid. These disadvantages, in many instances, outweighed the benefits derived by elimination of the evaporation and bagging steps associated with solid fertilizers.

In a fairly recent breakthrough in overcoming the disadvantages of liquid mixed fertilizers produced by the prior-art methods, there is found in application Ser. No. 835,377, John G. Getsinger, filed Aug. 29, 1959, the discovery that if phosphoric acid of the wet-process type containing up to a maximum of about 54 percent $P_2O_5$ is subjected to evaporating means, either at atmospheric or at reduced pressure, so as to condense the wet acid and raise its $P_2O_5$ content up to the range of approximately 60 to 76 percent $P_2O_5$, the formation of metallic precipitates which otherwise render wet-process phosphoric acid unusable for the preparation of liquid mixed fertilizers are substantially sequestered. In addition, there is taught in said application that if wet-process phosphoric acid is so concentrated, it may then be subsequently ammoniated to form liquid mixed fertilizers in which the metallic impurities originally present in said wet-process phosphoric acid remain sequestered and in solution. Substantially the same teachings wherein commercial grade wet-process phosphoric acid is concentrated and then subsequently ammoniated to form liquid mixed fertilizers is also found in U.S. Pat. No. 3,044,851, D. C. Young.

Still another and more recent breakthrough in overcoming disadvantages of the prior art enumerated supra is found in U.S. Pat. No. 3,382,059, Getsinger, wherein he produces liquid fertilizers from orthophosphoric acid of the wet-process type and ammonia wherein he circumvents or eliminates the separate heating and concentrating step found in his earlier referred to application and the disclosure of Young. In this later work, Getsinger has discovered that by combining orthophosphoric acid of the wet-process type and anhydrous ammonia in a direct method he is able to utilize the autogenous heat of reaction therein to effect the release of water from such acid whereby same is condensed while it is being ammoniated to form directly, without the separate heating and concentrating step, ammonium polyphosphate solutions.

In a more recent breakthrough, U.S. Pat. No. 3,775,534, Meline discovered that ammonium polyphosphate liquids that contained at least 80 percent of the phosphorus values as nonortho acyclic species may be produced by direct ammoniation of wet-process superphosphoric acid that contained at least some of the phosphorus values as the nonortho acyclic species.

As may be seen from the disclosures enumerated supra, it is now known in the art how to produce liquid mixed fertilizers having plant nutrient values comparable to many standard dry mixed fertilizers and, in addition, to the preparation of said liquid fertilizers by such means and in such forms so as to substantially overcome many of the disadvantages originally inherent in the production of liquid fertilizers prior to the Getsinger disclosure. As may also be seen from a consideration of the economics involved, it is in many instances more highly desirable to produce such liquid mixed fertilizers by the ammoniation of wet-process superphosphoric acid rather than from the ammoniation of the cleaner, but more expensive, superphosphoric acid of the electric furnace type.

However, with all the disclosures enumerated supra for the production of liquid fertilizers, a disadvantage still exists in the production of liquid fertilizer utilizing phosphoric acid of the wet-process type produced from the most prevalent source of phosphate rock in this country (uncalcined Florida phosphate). Due to the presence of soluble and insoluble organic matter, liquid fertilizers made from such acid are black in color. This coloration can mask the presence of any undesirable precipitated or suspended material in the liquid which can result in difficulties in application of the liquid and, as a result, the consumer will not use these liquids except in the case of extreme emergency, as the current fertilizer shortage, and then only when no supply of clear liquid can be obtained. At the conclusion of this fertilizer shortage, it is expected the consumer again will reject the use of black liquid fertilizers prepared with use of the uncalcined Florida rock.

It is an objective of the present invention to produce improved ammonium polyphosphate liquid from the impure liquid made with use of phosphoric acid produced from impure phosphate rocks, such as uncalcined Florida rock. These improved ammonium polyphosphate liquids are essentially free of insoluble organic carbonaceous matter and in a form highly acceptable to the consumer, a characteristic heretofore obtained only by use of the essentially pure electric furnace superphosphoric acid or the essentially carbonaceous-free acids made by use of calcined phosphate rocks.

Another objective of the present invention is to produce the improved ammonium polyphosphate liquids exclusively from impure wet process phosphoric acids made from impure phosphate rocks wherein the proportion of phosphorus values in the nonortho acyclic polyphosphate species is of the order of 50 to 90 percent.

Still further and more general objects and advantages of the present invention will appear from the more detailed description set forth below, it being understood, however, that this more detailed description is given by way of illustration and explanation only and not necessarily by way of limitation, since various changes therein may be made by those skilled in the art without departing from the true spirit and scope of the present invention.

The possible sources of organic matter in commercial wet-process phosphoric acids include the naturally occurring organic matter derived from the rock (hydrocarbons, unsaturated fatty acids, and degraded porphyrins), as well as the conditioning agents (fatty acids, tallow animals) and collecting agents (hydrocarbon oils, kerosene) that are used during the beneficiation steps. As a group, these organic materials are relatively inert neutral compounds that fall into solubility classes $N_1$ and $N_2$ (Schriner and Fuson, *Identification of Organic Compounds*, 2nd ed., John Wiley and Sons, New York, 1940), according to their solubility in reagent $H_3PO_4$. The neutral compounds that contain up to about 10 carbon atoms are soluble in reagent 80 percent $H_3PO_4$ (class $N_1$), whereas the longer-chain neutral compounds are not soluble (class $N_2$).

In merchant-grade wet-process acid, the insoluble organic matter is present principally as long-chain saturated fatty acids and waxy long-chain hydrocarbons. The soluble organic matter is of the same classes but of shorter chain length. On concentration of wet-process acid to the superphosphoric acid range (about 70 percent or more $P_2O_5$), significant amounts of the soluble short-chain organic matter is decomposed (charred) and polymerized with the result that an additional large amount of finely divided carbonaceous matter is formed that remains suspended in the acid or in ammonium polyphosphate liquids prepared from the acid. Further evidence of the partial decomposition (charring) and polymerization was shown by the retention of insoluble carbonaceous char in the equipment used in the identification study and the markedly greater hardness of the hydrocarbon waxes in comparison with those present in merchant-grade acid. The finely divided carbonaceous matter present in wet-process superphosphoric acid or in ammonium polyphosphate liquids produced from impure acids prepared from uncalcined phosphate rocks are extremely difficult to remove by filtration and settles at an extremely slow rate because of its small size.

The use of organic compounds per se for the clarification of wet-process acid or of ammonium polyphosphate solutions prepared from the acid is not unknown. Ittlinger, in U.S. Pat. No. 3,129,170, describes a process for clarification of shipping or merchant-grade wet-process phosphoric acids that contain suspended solid metallic and organic impurities. The process comprises addition of an amine clarification agent to increase the settling rate of the impurities followed by separation of the clarified fraction.

Ittlinger points out that the impurities present comprise calcium, iron and aluminum phosphates, double salts of iron and aluminum phosphates with phosphoric acid, and also some organic compounds. He states that these impurities "upon standing in storage or during shipment in tank cars or the like . . . deposit a layer of solid matter which renders handling of the stored or shipped acid exceedingly difficult and frequently economically unfeasible." He apparently had no idea of the problems that arise because of the presence of finely divided carbonaceous chars and other matter that are formed on production of superphosphoric acid or ammonium polyphosphate from wet-process merchant-grade acids. He was not concerned with treatment of a finely divided material which tended to remain suspended. Furthermore, clarification of wet-process phosphoric acid before it is processed into phosphatic solutions that contain polyphosphate is essentially useless with regard to eliminating the particulate black carbonaceous material since additional particulate carbonaceous material forms on heating to temperatures high enough to form polyphosphate. Therefore, to obtain a clear liquid phosphatic solution that is not black in color, clarification must occur after the polyphosphates are formed and at a low enough temperature not to degrade the flocculating agent before it has a chance to cause the black particulate carbonaceous material to float to the surface where it can be removed.

Burkert and Nickerson in U.S. Pat. No. 3,630,711 described a process for removing black particulate carbonaceous matter from 10–34–0 grade ammonium polyphosphate liquids which involves combining 0.1 to 0.6 percent by weight of a water-insoluble aliphatic amine with the liquid and then allowing the particulate carbonaceous matter to flocculate and float as a froth to the surface. They state that in their pilot-plant operation they prefer to employ agitator apparatus and introduce air through an air sparger during the mixing. They further state that the amine residue coats the carbonaceous solids, collects the air bubbles and rises to the surface in a froth. The froth is separated from the underflow. To secure a high recovery of $P_2O_5$ values the froth from the flotation step is diluted with water and refloated. Even then, Burkert et al. allowed for the further step of filtering the product underflow. In column 3, line 8, they state, ". . . the underflow which may contain a small amount of suspended solids may be filtered through a filter cloth tied about the product outlet pipe. For such filtration, we have found Nylon, Dynel, cotton, and other fabrics to be very useful." In examples of their process wherein they recovered high proportions of the input 10–34–0 clarified product in short periods of time, they passed the treated liquid through a bag filter prior to the final cooling step.

In our novel invention described herein, we utilize a combination of two flocculating agents, an aliphatic amine or aliphatic amine acetate and quaternary ammonium chloride, at addition rates significantly less than utilized by Burkert et al and obtain a synergistic effect thereby with the result that we cause black particulate carbonaceous matter to flocculate and rise to the surface of a more concentrated liquid fertilizer solution than described by them in 3,630,711, supra. Furthermore, by use of the combination of our organic flocculating agents, the entire clarification process is simplified into one single separation stage instead of two or more stages (one or two separation stages and a filtering step) as described in 3,630,711, supra, without sacrifice of the recovery of clarified liquid fertilizer. Still further, the necessity for spraying air into the mixing and agitation portion of the process is eliminated. Still further yet in our new and novel single-stage separation process, the necessity for diluting the froth from intermediate steps with water to increase the recovery of clarified liquid to an economical level is eliminated.

Our invention, together with its desired objectives and further advantages thereof, will be better understood from a consideration of the following description taken in connection with the accompanying drawings in which.

Figure 5:
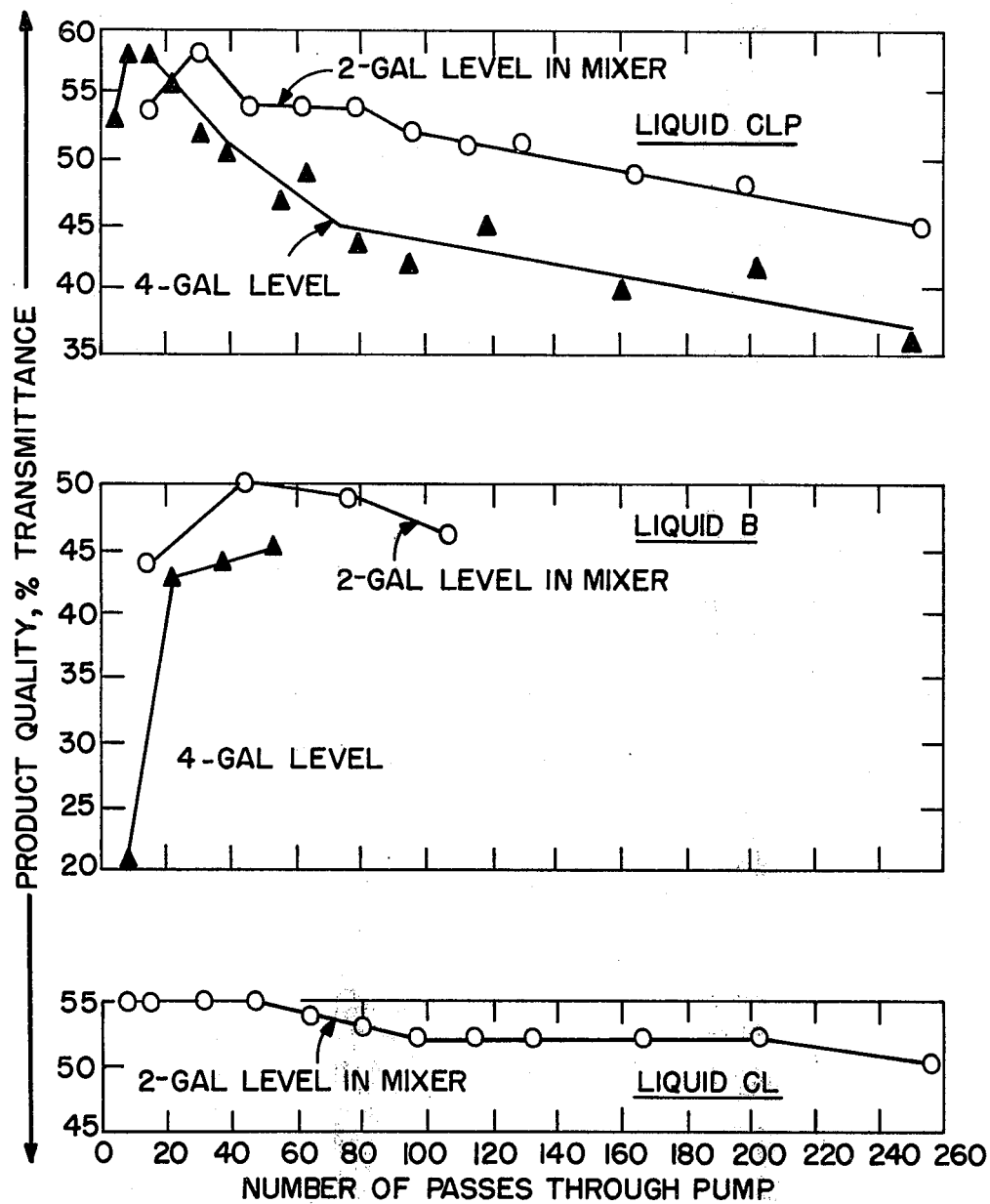

FIG. 5 graphically illustrates the effect on product quality of number of passes of the 11–37–0 flocculant mixture through a mixing pump. This FIGURE is referred to more specifically in Example IV, paragraph 5, immediately after table I.

Figure 6:
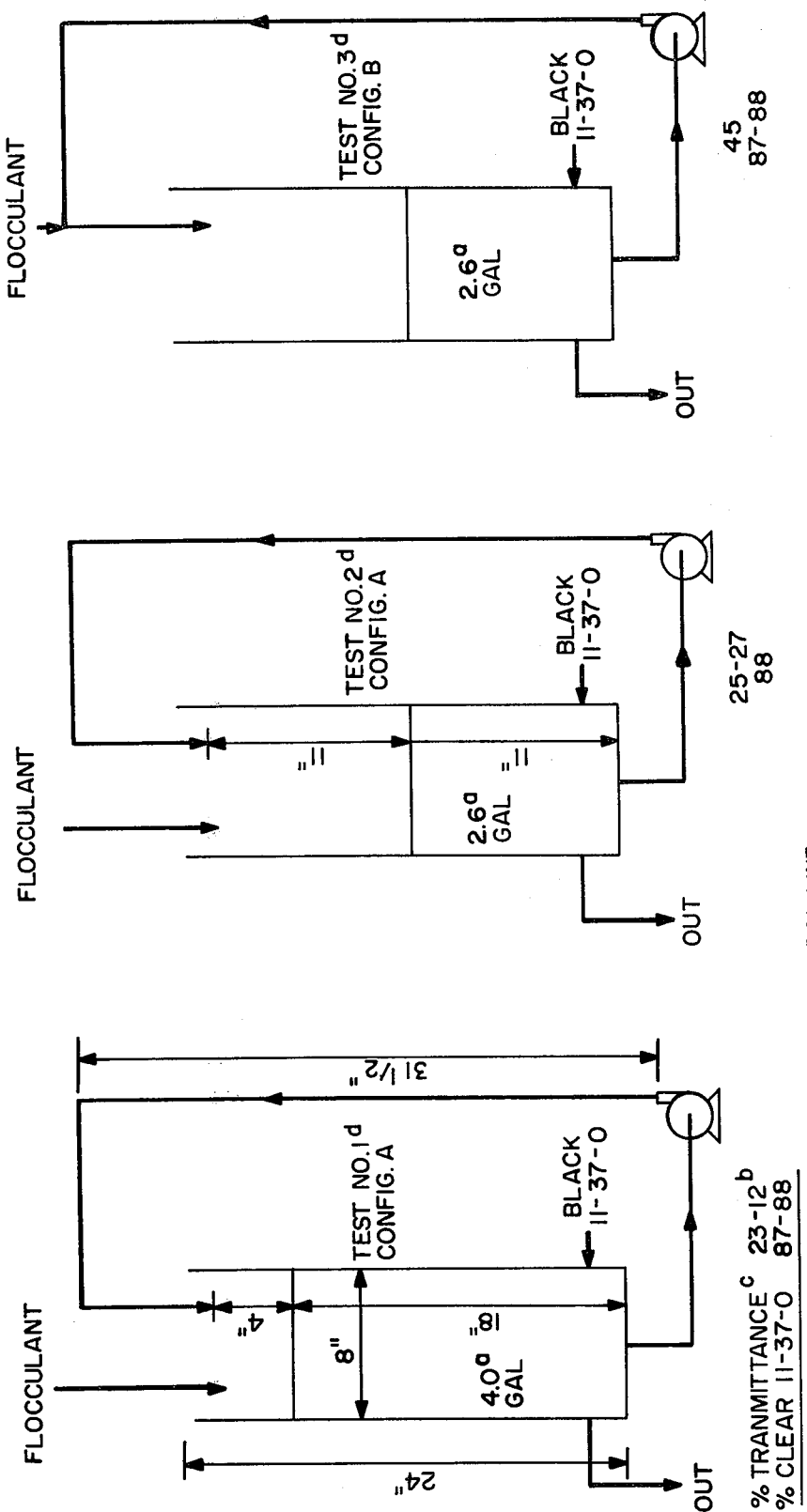
Figure 7:
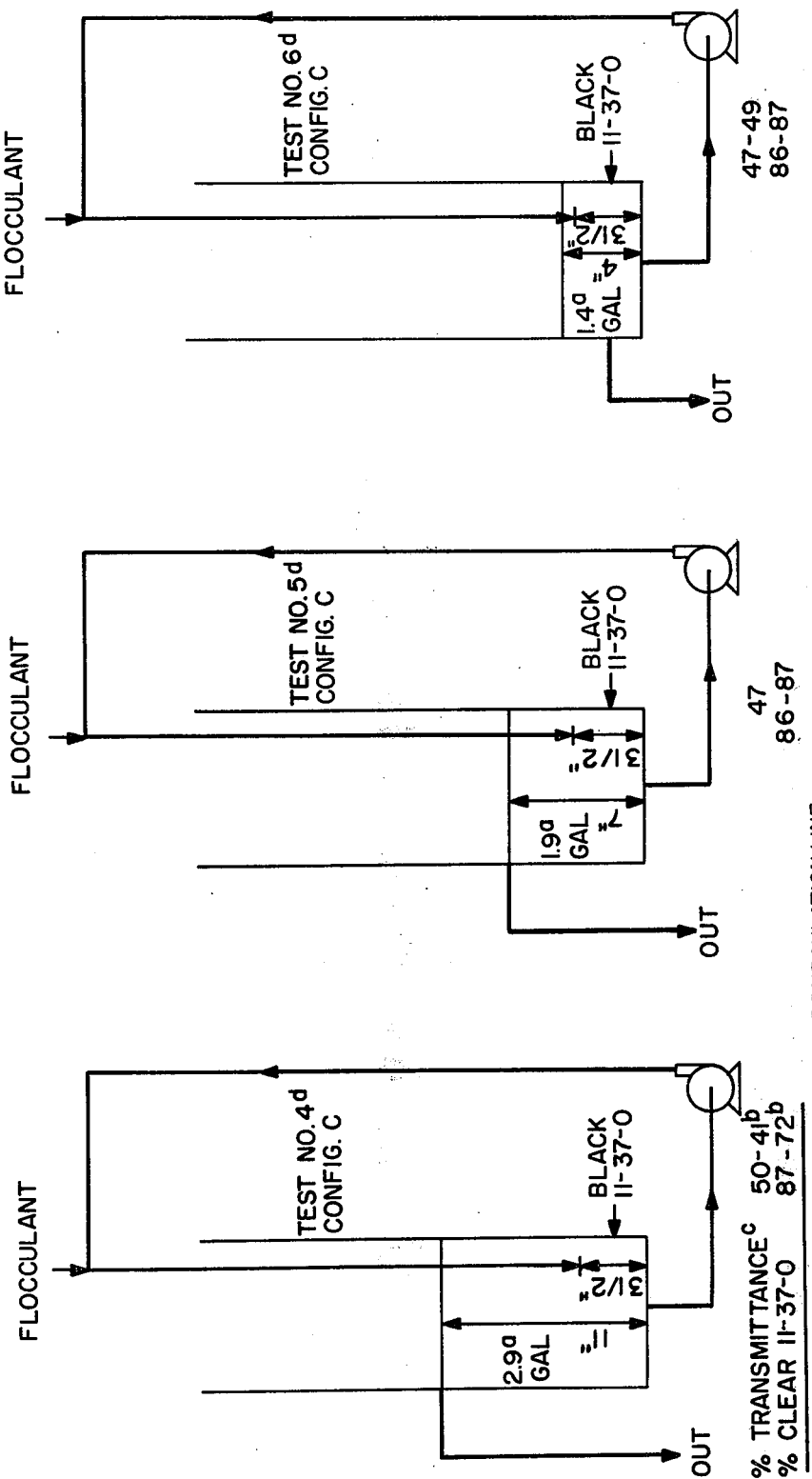
Figure 8:
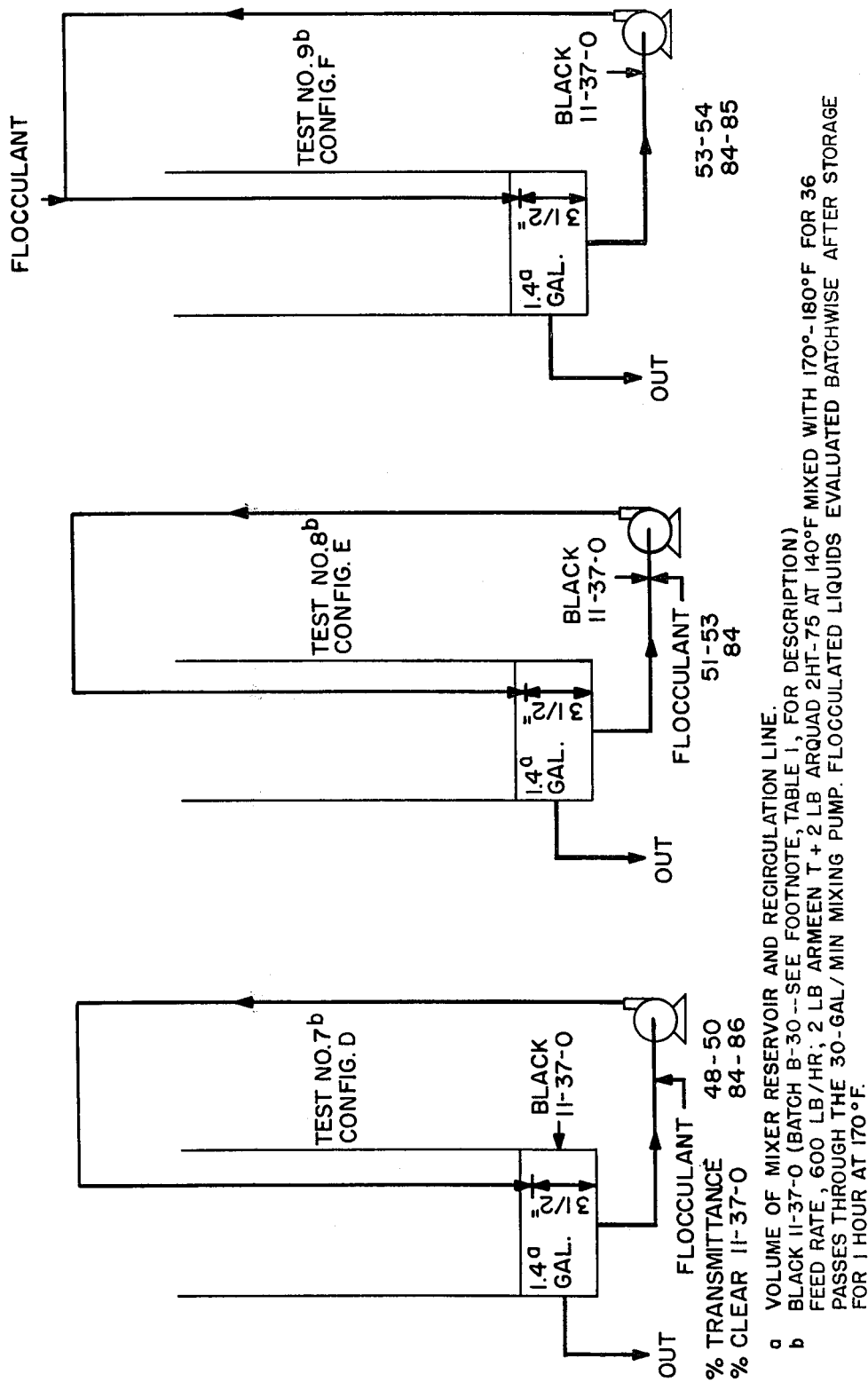

FIGS. 6, 7, and 8 show nine different pilot plant mixer configurations used to determine the effect on product recovery and clarity by various mixing schemes. These figures are referred to more specifically in Example IV, paragraph 11.

Figure 1:
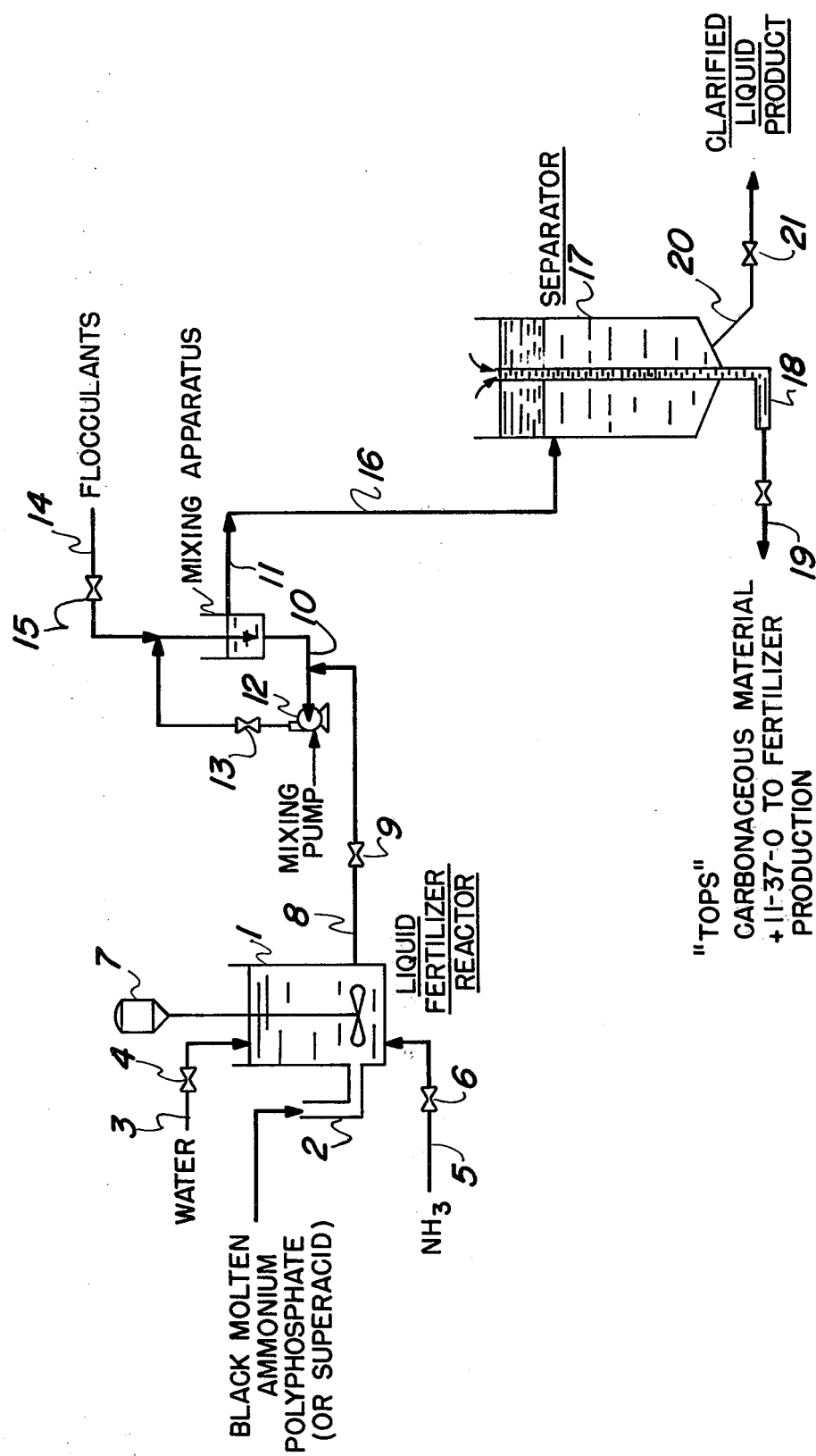
FIG. 1 is a flowsheet illustrating principles of our novel process.

Referring now more specifically to FIG. 1, it can be seen that one embodiment of our new and novel process for removing the undissolved particulate black carbonaceous material from black liquid fertilizer utilizes flocculants to cause the particulate black carbonaceous material to separate and float to the surface where it can be removed. In producing the black liquid fertilizer to be clarified, black molten ammonium polyphosphate (or black superphosphoric acid) from a source and means of control not shown is fed to liquid fertilizer reactor 1 via line 2 along with water from a source not shown via line 3 and means for control 4 and ammonia, when required, from a source not shown via line 5 and means for control 6. Mixing of the water, ammonium polyphosphate, and ammonia in liquid fertilizer reactor 1 is generally accomplished with means for agitation and mixing 7. Control of the temperature in liquid fertilizer reactor 1 is accomplished with cooling coils which are not shown and means for introducing cooling medium such as water, which also is not shown in FIG. 1. (Other means of cooling also could be employed). The black liquid fertilizer of the desired pH and concentration is withdrawn from liquid fertilizer reactor 1 via line 8 and means for control 9, and passes into recirculation line 10, which is a part of a mixing apparatus used to mix the flocculants from a source not shown with the black liquid fertilizer. The mixing apparatus is composed of a mixing reservoir 11 and a pump 12, which recirculates the black liquid through the mixer reservoir 11 and provides the mixing action required to combine the flocculants with the black liquid fertilizer. The amount of flow through mixing pump 12 may be controlled by a valve 13 in recirculation line 10. The flocculants from a source not shown are fed into mixer recirculation line 10 via line 14 and means of control 15. Alternatively, the flocculants and black liquid fertilizer may be mixed in reservoir 11 by any suitable means, for example, a high-speed agitator, which is not shown. Also another alternative is the addition of the flocculants to the liquid fertilizer reactor 1. This could be accomplished with the mixing pump 12, by adding the flocculants into recirculation line 10, which would then discharge directly into liquid fertilizer reactor 1 instead of mixer reservoir 11. Referring again to FIG. 1, the flocculated black liquid fertilizer is then discharged from the mixing apparatus via line 16 into separator 17 where the flocculated carbonaceous material separates from the clarified product. The black carbonaceous material floats to the top of vessel 17 and overflows from the top of vessel 17 to be used in subsequent fluid or solid fertilizer processes; one method of removing the carbonaceous material is to allow it to overflow into a central standpipe line 18 through a means for control 19 and into other fertilizer processes, not shown. The clarified liquid product is withdrawn from separator 17 via line 20 and means for control 21 into suitable storage vessels for subsequent sales. Separator 17 may be operated either continuously on or a batch basis, as may the remainder of the equipment.

DESCRIPTION OF THE PROCESS

The black liquid fertilizer of pH between 5.5 and 6.5 to be clarified is mixed with the proper amount of flocculants and this mixture is then discharged into a separation vessel where te particulate black carbonaceous material floats to the surface along with essentially all of the flocculants. In a continuous-type process, the black upper portion in the separation vessel continuously overflows to a storage vessel and the clarified liquid that is essentially free of particulate carbonaceous material is withdrawn from the bottom of the vessel and sent to storage. Usually both the undeflow (clarified liquid) and the overflow ("tops" containing most of the particulate black carbonaceous material plus a small amount of liquid fertilizer) are cooled prior to storage to prevent hydrolysis of polyphosphates.

In a batch-type process, one method of operation would be to have two separation vessels and to fill one vessel while in the other previously filled one the liquid is clarified; the separate portions are withdrawn and fed to their respective cooling and storage areas. Obviously, the mixing of the flocculants with the black liquid could be carried out either continuously or batchwise with this type operation.

The above methods of operation are examples of ways that the process can be carried out and are not intended to limit the possible other methods that would also result in separation of the black particulate carbonaceous material from liquid fertilizer.

In operation of the continuous-type process shown in FIG. 1, it has been found that there are several critical process variables that must be understood and that require the process to be operated in a prescribed manner in order for the liquid to be clarified in an efficient and economical manner. One group of process variables that was especially critical was the effect of temperature and retention time in the separator on amount of clarified phosphatic fertilizer solution recovered.

Figure 2:
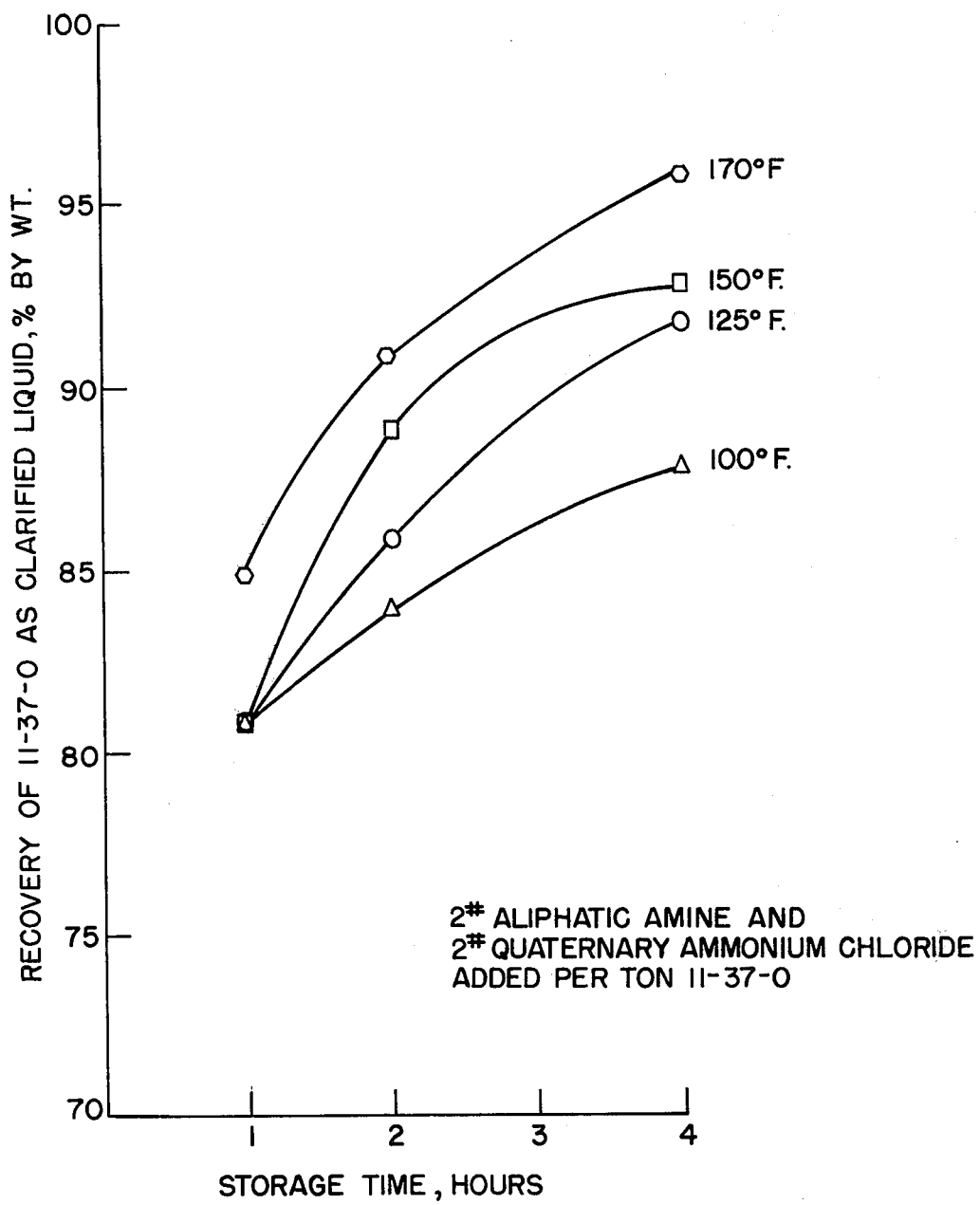
FIG. 2 is a graphical illustration of the effect of storage time on recovery of clarified liquid at various stage times.

Referring now more specifically to FIG. 2, the results from batch tests concerning these variables indicate that highest recovery of clarified phosphatic fertilizer solution was obtained when the storage temperatures were highest and the storage times longest.

Figure 3:
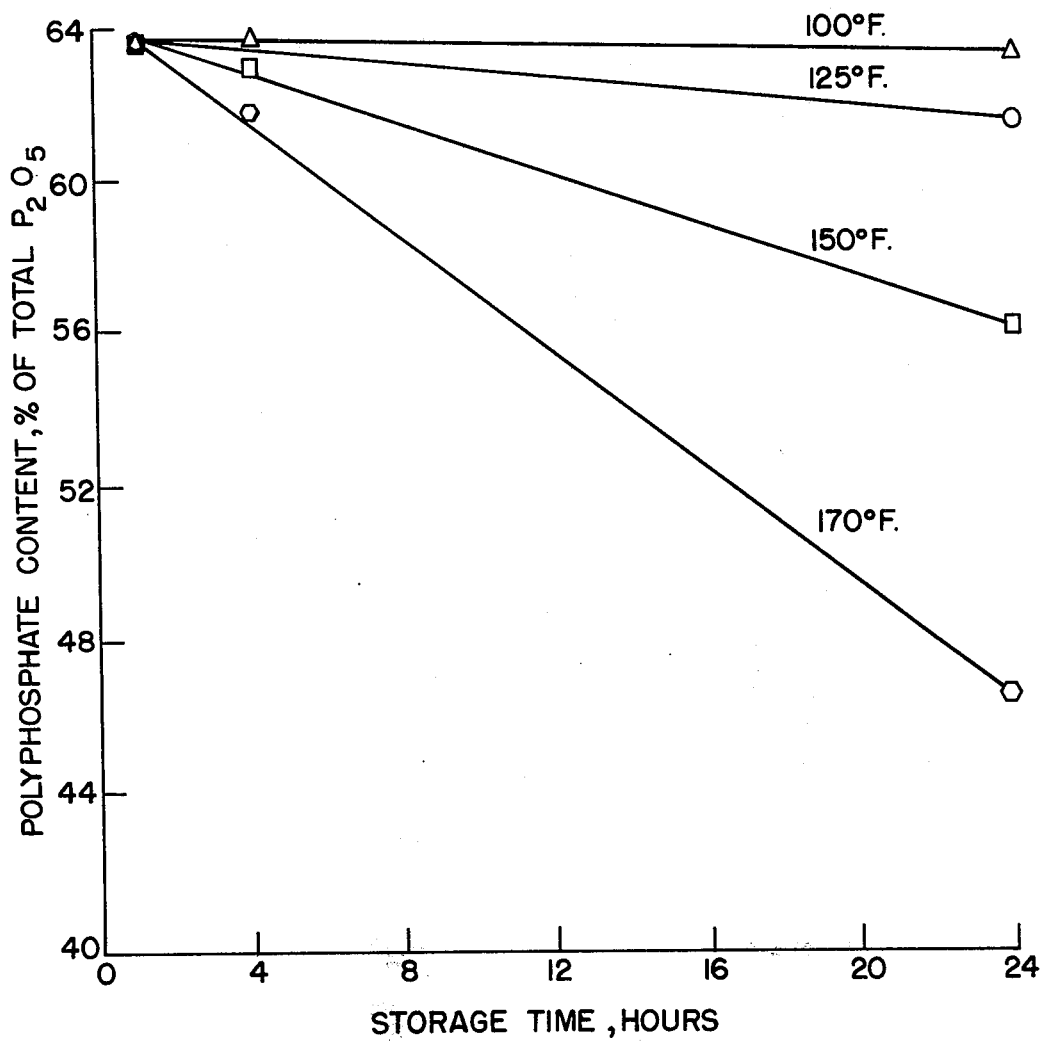
FIG. 3 is a graphical illustration of the effect of storage time on the polyphosphate content lost at various stage temperatures.

Referring now more specifically to FIG. 3, it may be appreciated that long storage times at elevated temperatures cause hydrolysis of polyphosphate which sequesters the impurities in wet-process acids. Therefore, the best selection of time and temperatures in the separator will depend on the amount of polyphosphate loss that can be tolerated. For our tests, mixer and separator temperatures of 170°F to 180°F and a separator retention time of about 1 hour generally were used. However, it is obvious that other time-temperature combinations could be used with equally satisfactory results.

Another area that was found to be important in obtaining satisfactory clarification results was in design and operation of the mixing system in which the black phosphatic fertilizer solution was combined with the flocculants. In the preliminary work, batch tests were made attempting to mix with a marine propeller-type agitator (tip speed of 35 feet per second), but essentially no flocculation occurred.

To enable testing of this process, several liquid fertilizers were produced by the TVA pipe-reactor process (i.e., ammoniation of superphosphoric acid with anhydrous ammonia in a pipe followed by dissolution of the molten ammonium polphosphate in sufficient ammonium hydroxide of the desired nitrogen content to give a liquid of the desired pH, density, and plant nutrient content) and various flocculants, as described in the following examples I, II, and III, were evaluated to determine the best flocculant or flocculants to use.

EXAMPLE I

Five hundred gram portions of black 11-37-0 grade liquids were mixed with various flocculants at 170° to 180°F for 5 minutes with a Premier Series 2000 Dispersator equipped with a duplex head that rotated at 400 revolutions per minute. After mixing, the batches were placed in 500-milliliter graduates and stored in an oven set at 170°F. The efficiency of the flocculants in causing the black particulate matter to rise and separate was determined by measuring the proportion of clarified liquid present 15, 30, and 60 minutes after the mixing ceased and the amount of light transmitted at a wavelength of 560 nanometers through a sample (½-inch-diameter test tube) of material that had settled for 60 minutes. Distilled water was used as a standard and a Bausch and Lomb Spectronic 20 colorimeter was calibrated so that it allowed 100 percent of the light transmitted to pass through the sample of distilled water. To be satisfactorily clarified a liquid should allow at least 25 percent of the light transmitted at 560 nanometers to pass through the sample and at least 80 percent of the input liquid should be recovered in 60 minutes as clarified product.

One of the flocculants tested was a primary aliphatic tallow amine with the major component being $C_{18}H_{35}NH_2$. It also contains a significant amount of amine with chain lengths of 16 carbon atoms, and as shown in the following typical chain length distribution data furnished by the manufacturer (Armak chemicals, Division of Akzona, Inc.), contained no measurable amounts of amines with chain length in excess of 18 carbon atoms. This material is referred to by the manufacturer as Armeen T. Armeen T is derived from tallow and contains all the chain lengths found in tallow from $C_{12}$ through $C_{20}$; the $C_{12}$ and $C_{20}$ is in trace amounts. Unsaturates in the amine will be different from the tallow because dydrogenation will convert same to the saturated component.

| Typical Chain Length Distribution (as determined by gas chromatography) | | | |
|---|---|---|---|
| Saturated | | Unsaturated | |
| Caproyl C-6 | — | Myristoleyl C-14' | 1.0 |
| Caprylyl C-8 | — | | |
| Capryl C-10 | — | Palmitoleyl C-16' | 3.0 |
| Lauryl C-12 | 1.0 | | |
| Myristyl C-14 | 3.0 | Oleyl C-18' | 37.0 |
| Pentadecyl C-15 | 0.5 | | |
| Palmityl C-16 | 29.0 | Linoleyl C-18' | 1.5 |
| Margaryl C-17 | 1.0 | | |
| Stearyl C-18 | 23.0 | | |

Another flocculant tested was Armeen TD bottoms that was reported by the manufacturer (Akzona, Inc.) to be an Armeen distillation residue. Amine distillation bottoms is a mixture of primary amines, dialkyl secondary amines, amides (simple and substituted) and hydrocarbons. Two recent analyses showed 15 primary and 46 percent secondary and 15 percent primary and 41 percent secondary, respectively. In U.S. Pat. No. 3,630,711, Armeen residue was described as consisting mainly of primary aliphatic amines containing from 12 to 22 carbon atoms.

These aliphatic amines are in the class described in U.S. Pat. No. 3,630,711 as satisfactory flocculants for clarifying 10–34–0 grade ammonium polyphosphate liquid fertilizers. It is pointed out that the amine residues used as the primary flocculant in 3,630,711 supra are variable in composition. They are distillation residues from catalytic hydrogenation of nitrile to form specific primary amines.

Data from tests with these flocculants, tabulated below, show that use of the aliphatic amine residue did not result in any appreciable separation of the carbonaceous matter until 12 pounds of the residue was used per ton of black 11–37–0 and even then the liquid produced was poorly clarified and of unsatisfactory quality.

With use of Armeen T, which has a major component of $C_{13}H_{35}NH_2$, good separation of carbonaceous matter occurred in the four liquids tested when used in a rate of 2–4 pounds per ton of black 11–37–0 (0.1–0.2 percent by weight). This proportion is within the range specified in U.S. Pat. No. 3,630,711. When Armeen T was used at a lower rate of 1 pound per ton of black 11–37–0 (0.05 percent by weight) which was below the range specified in U.S. Pat. No. 3,630,711, good clarification resulted with one black 11–37–0 liquid but not for a second liquid.

with several black 11–37–0 liquids using the procedure described in Example I. The acetate salt is reported by the manufacturer (Armak Chemicals, Division of Akzona, Inc.) mostly to contain from 16 to 18 carbon atoms. A typical chain length analysis furnished by the manufacturer shows 25 percent of hexadecyl, 72 percent of octadecyl, and 3 percent of octadecenyl. The quaternary ammonium chloride is a di(hydrogenated) dimethyl ammonium chloride compound and is reported by the manufacturer (Armak Chemicals, Division of Akzona, Inc.) to contain longchain hydrocarbons in which the chain lengths vary primarily from 16 to 18 carbon atoms in length; a typical chain length analysis of the major components furnished by the manufacturer showed 24 percent hexadecyl, 75 percent octadecyl, and 1 percent octadecenyl. There are small amounts of $C_{12}$, $C_{14}$, $C_{15}$, $C_{17}$, $C_{20}$, etc., present. These flocculants are referred to by the manufacturer as Armac HT and Arquad 2HT-75, respectively. Other manufacturers produce similar materials and refer to them by other designations.

Data from tests with these flocculants which are summarized below show that excellent clarification was obtained with use of the acetate salt of the aliphatic amine (Armac HT) when used at a rate of 3 pounds per ton of black 11–37–0. Use of the quaternary ammonium chloride (Arquad 2HT-75) alone gave poor re-

| 11-37-0 liquid[a] designation | Flocculant Designation | Lb added/ ton black 11-37-0 | Percent in black 11-37-0 | 15 or 30 min Clear 11-37-0, % by wt. | 1 hour Clear 11-37-0 % by wt. | Percent transmittance |
|---|---|---|---|---|---|---|
| A | Aliphatic | 0 | 0 | 0[b] | 0 | 0 |
| A | amine | 1 | 0.05 | 0[b] | 0 | 0 |
| A | residue | 2 | 0.1 | 0[b] | 0 | 0 |
| A | (Armeen TD) Bottoms | 12 | 0.6 | 51[b] | 67 | 2 |
| A | Aliphatic | 0 | 0 | 0[b] | 0 | 0 |
| A | amine | 1 | 0.05 | 83[b] | 85 | 34 |
| A | (Armeen T) | 2 | 0.1 | 87[b] | 89 | 39 |
| K | | 1 | 0.05 | 72 | 77 | "B"[c] |
| K | Aliphatic | 2 | 0.1 | 77 | 81 | "B"[c] |
| K | amine | 3 | 0.15 | 77 | 81 | "B"[c] |
| K | (Armeen T) | 4 | 0.2 | 82 | 85 | 50 |
| L | | 2 | 0.1 | 84 | 89 | 60 |
| K-1 | | 2 | 0.1 | 81 | 84 | 45 |

| [a] Liquid designation | Wet-process superphosphoric acid source | Liquid fertilizer Made by | Polyphosphate level, % of total $P_2O_5$ | Grade |
|---|---|---|---|---|
| A | Company A | TVA | 79 | 11.1–37.0–0 |
| K | Company B | TVA | 76 | 10.2–36.6–0 |
| K-1 | Company B | TVA | 88 | 10.5–37.1–0 |
| L | Company A | Company A | 63 | 11.0–35.5–0 |

[b]30-minute observations.
[c]Refers to translucent, well-clarified liquids that contained essentially no particulate carbonaceous matter. (Rating system utilized prior to use of colorimeter spectrophotometer.)

EXAMPLE II

Two flocculants, an acetic salt of an aliphatic amine and a quaternary ammonium chloride were next tested sults; the carbonaceous matter separated well, but the remaining liquid was of unsatisfactorily poor quality.

| Black liquid[a] designation | Additive Designation | Lb added/ ton black liquid | % in black 11-37-0 | Batch separation tests Results after | | |
|---|---|---|---|---|---|---|
| | | | | 15 min. Clear 11-37-0 % by wt. | 1 hour Clear 11-37-0 % by wt. | 1 hour 11-37-0 clarity, % transmittance |
| K-1 | Acetate salt of aliphatic amine (Armac HT) | 3 | 0.15 | 81 | 85 | 44 |
| I[a] | | 3 | 0.15 | 85 | 89 | 45 |
| K | | 3 | 0.15 | 87 | 89 | 50 |
| K | | 3 | 0.15 | 88 | 91 | 62 |
| K | Quaternary ammonium chloride (Arquad 2HT-75) | 3.5 | 0.175 | 86 | 90 | <25 |
| K | | 5 | 0.25 | 89 | 90 | <25 |

[a]11.2–37.6–0 grade liquid produced at TVA from commercial wet-process superphosphoric acid from Company C.

EXAMPLE III

In Example I and II it was shown that an aliphatic amine and an aliphatic amine acetate salt caused effective flocculation but that a relatively large dosage of each was required. About 3 pounds of the amine acetate and 2 to 4 pounds of the amine were required per ton of 11–37–0 for effective separation of the carbonaceous materials. A quaternary ammonium chloride, Arquad 2HT-75, when used as the additive in proportions of 3.5 to 5 pounds per ton of 11–37–0, did not give effective clarification; the liquid obtained was of unsatisfactorily poor quality.

The following example illustrates the unexpected synergistic effect of combining aliphatic amine acetate (Armac HT), or aliphatic amine (Armeen T), with quaternary ammonium chloride (Arquad 2HT-75). The tests were made with the procedure described in Example I. Details and results are shown in the following tabulation.

| Test No., CL- | Black 11-37-0[a] designation | Lb flocculant/ton 11-37-0 | | | Percent recovery of clarified 11-37-0 after | | Percent transmittance through clarified 11-37-0 after 60 min |
|---|---|---|---|---|---|---|---|
| | | Aliphatic amine acetate (Armac HT) | Aliphatic amine (Armeen T) | Quaternary ammonium chloride (Arquad 2HT-75) | 15 min | 60 min | |
| Aliphatic Amine Acetate | | | | | | | |
| 104 | CLP-1/31 | 3.0 | — | — | 84 | 89 | 35 |
| Aliphatic Amine Acetate and Quaternary Ammonium Chloride | | | | | | | |
| 102 | CLP-1/31 | 1.9 | — | 1.3 | 84 | 92 | 54 |
| Aliphatic Amine and Quaternary Ammonium Chloride | | | | | | | |
| 1:1 Flocculant Weight Ratio | | | | | | | |
| 100 | CLP-1/31 | — | 1.9 | 1.9 | 81 | 93 | 63 |
| 101 | CLP-1/31 | — | 1.0 | 1.0 | 78 | 86 | 49 |
| 113 | CL-1/8 | — | 1.0 | 1.0 | 93 | 95 | 50 |
| 115 | CL-12/19 | — | 1.0 | 1.0 | 83 | 89 | 53 |
| 103 | CLP-1/31 | — | 0.4 | 0.4 | 85 | 89 | 33 |
| 2:1 Flocculant Weight Ratio | | | | | | | |
| 107 | CLP-1/31 | — | 1.36 | 0.68 | 84 | 88 | 50 |
| 109 | CLP-1/31 | — | 0.55 | 0.28 | 84 | 90 | 37 |
| 3:1 Flocculant Weight Ratio | | | | | | | |
| 116 | CLP-1/31 | — | 1.57 | 0.52 | 84 | 89 | 54 |
| 111 | CLP-1/31 | — | 0.63 | 0.21 | 84 | 89 | 38 |
| 112 | CLP-1/31 | — | 0.315 | 0.105 | 81 | 87 | 28 |

[a]Description of liquids tested are as follows:

| Designation | Acid Manufacturer | Batch | 11-37-0 composition, % by wt. | | | % of total $P_2O_5$ as polyphosphate in | |
|---|---|---|---|---|---|---|---|
| | | | Total N | Total $P_2O_5$ | W.I. solids | Acid | 11-37-0 |
| CLP-1/31 | A | 26 | 11.0 | 37.5 | 0.2 | 23 | 74 |
| CL-1/8 | A | 25 | 10.8 | 35.9 | 0.4 | 30 | 74 |
| CL-12/19 | B | 24 | 10.5 | 37.1 | 0.2 | 33 | 88 |

One test for comparison purposes (test 104) was made with the amine acetate at the 3-pound-per-ton level. Recovery of clear 11–37–0 after 60 minutes of settling was 89 percent, the same as that obtained earlier with this amount of additive and other liquids. The product was of satisfactory quality, 35 percent light transmission.

One test (test 102) was made with the amine acetate in combination with the quaternary ammonium chloride; the respective amounts added were 1.9 and 1.3 pounds per ton of 11–37–0. The results show that both recovery (92 percent) and clarity (54 percent) were higher than with the acetate alone.

The remaining tests were made with aliphatic amine and the quaternary ammonium chloride used jointly in various proportions. The pertinent results, taken from the tabulation, are summarized in the following tabulation.

| Total percent in 11-37-0 | Flocculant Total lb/ton of 11-37-0 | Percent of input recovered as clear 11-37-0 (and % transmittance)$^a$ for a given wt. ratio of aliphatic amine to quaternary ammonium chloride | | |
|---|---|---|---|---|
| | | 1:1 | 2:1 | 3:1 |
| 0.19 | 3.8 | 93(63) | — | — |
| 0.1–0.105 | 2.0–2.1 | 86(49) | 88(50) | 89(54) |
| 0.04–0.0415 | 0.80–0.83 | 89(33) | 90(37) | 89(38) |
| 0.021 | 0.42 | — | — | 87(28) |

$^a$On storage at 170°–180°F for 1 hour.

The percentage of input 11-37-0 recovered as clear liquid did not vary significantly as the weight ratio of amine to chloride was increased from 1:1 to 3:1. However, there was evidence of a slight increase in product quality with the increase in ratio.

Tests made with either 1 pound each of 0.4 pound each of the amine and quaternary ammonium chloride per ton of 11-37-0 with 11-37-0 liquids available gave similarly satisfactory results. Also, tests made at a 2:1 and 3:1 amine to quaternary ammonium chloride ratio and at similarly satisfactory results. Also tests made at a 2:1 and 3:1 amine to quaternary ammonium chloride ratio and at similarly low amine levels of 0.5 and 0.3 pound per ton of black 11-37-0 gave satisfactory clarification.

Thus, it can be seen that unexpectedly we were able to obtain liquids satisfactory in clarity and recovery by combining very small amounts (as little as 0.02 percent by weight each) of two cationic flocculants, namely, an aliphatic amine and a quaternary ammonium chloride or a mixture of the amine acetate and quaternary ammonium chloride.

EXAMPLE IV

Several batch tests were next made in a pilot-plant mixer to obtain information on the factors important in obtaining proper blending of the flocculants with black 11-37-0 by use of a closed-impeller centrifugal pump (tip speed of 38 ft/sec). Factors that may be important in mixing in the pump are the type of pump, tip speed of impeller, pump back pressure, and average number of passes of liquid through the pump.

Figure 4:
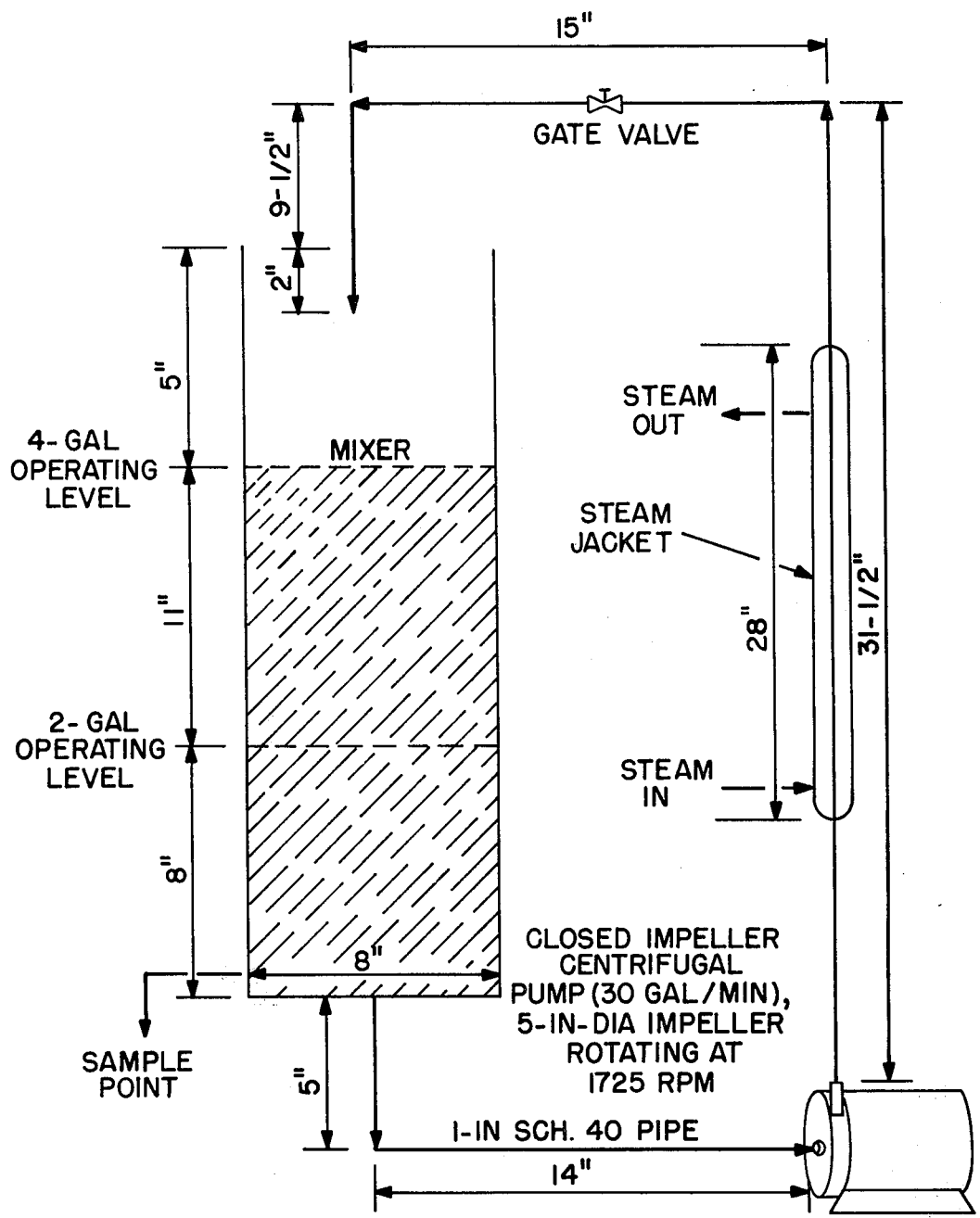
FIG. 4 shows a mixing apparatus used in tests of batch mixing of flocculant with 11–37–0. This FIGURE is referred to more specifically in Example IV, paragraph 2.

Referring now more specifically to FIG. 4, a detailed description of the mixing system is shown.

In making the tests, either a 2–or 4–gallon batch of black 11-37-0 liquid was placed in the mixer. Steam was added to the jacketed section of the recirculation line and liquid recirculated until it was heated to 180°F. Steam was added as necessary to maintain this temperature. Then, the flocculants were added. Samples of the mixture were withdrawn from the bottom of the mixer at short intervals over 7- to 30-minute test periods and stored in 100-milliliter graduates in a 170°F oven. The number of passes of liquid through the pump varied from a minimum of 8 or 15 to maximums of 250 to 575. After 1 hour of quiescent storage in the oven, the amount of clarified 11-37-0 present in each sample was measured and the clarity of the clarified liquid was determined. This was an effective small-scale method for indicating the quality of 11-37-0 and the present recovery of clear 11-37-0 that would be obtainable from a pilot-plant separator.

Results from the tests made with three batches of aged 11-37-0 produced with acid from two different manufacturers are shown in Table I, below.

Table I

Tests of Batch Mixing Black 11-37-0 and Flocculant$^a$ with a Centrifugal Pump

| Test No. | 3/14 | | | 3/15 | | | | | | CLP-4/3/74 | | | | | |
|---|---|---|---|---|---|---|---|---|---|---|---|---|---|---|---|
| Black 11-37-0 designation$^b$ | CLP-3/1, 3/5, 3/7 | | | | | | C1-12/19, 12/20 | | | | | | B-29 | | |
| Vol., gal initially in mixer$^c$ | 2 gallons | | | 4 gallons | | | 2 gallons | | | 2 gallons | | | 4 gallons | | |
| Liquor Clarity (%T)$^d$ and % recovery after indicated number of pump passes and retention time, min | No. of pump passes | %T | % clear 11-37-0 | No. of pump passes | %T | % clear 11-37-0 | No. of pump passes | %T | % clear 11-37-0 | No. of pump passes | %T | % clear 11-37-0 | No. of pump passes | %T | % clear 11-37-0 |
| ½ | — | — | — | 4 | 53 | 90 | 8 | 55 | 86 | — | — | — | — | — | — |
| 1 | 15 | 54 | 88 | 8 | 58 | 89 | 15 | 55 | 87 | 15 | 44 | 94 | 7 | 21 | 89 |
| 2 | 30 | 58 | 88 | 15 | 58 | 90 | 31 | 55 | 88 | — | — | — | — | — | — |
| 3 | 46 | 54 | 87 | 23 | 56 | 91 | 47 | 55 | 88 | 45 | 50 | 93 | 23 | 43 | 91 |
| 4 | 62 | 54 | 89 | 31 | 52 | 89 | 63 | 54 | 89 | — | — | — | — | — | — |
| 5 | 79 | 54 | 88 | 39 | 51 | 90 | 80 | 53 | 90 | 76 | 49 | 95 | 38 | 44 | 90 |
| 6 | 96 | 52 | 88 | 47 | 49 | 89 | 97 | 52 | 89 | — | — | — | — | — | — |
| 7 | 113 | 51 | 90 | 55 | 47 | 93 | 114 | 52 | 90 | 107 | 46 | 95 | 53 | 45 | 91 |
| 8 | 131 | 51 | 88 | 63 | 49 | 91 | 132 | 52 | 89 | — | — | — | — | — | — |
| 10 | 166 | 49 | 89 | 79 | 44 | 90 | 167 | 52 | 90 | — | — | — | — | — | — |
| 12 | 201 | 48 | 87 | 95 | 42 | 91 | 203 | 52 | 90 | — | — | — | — | — | — |
| 15 | 255 | 45 | 87 | 120 | 45 | 90 | 257 | 50 | 89 | — | — | — | — | — | — |
| 20 | 344 | 43 | 87 | 161 | 40 | 90 | 347 | 49 | 90 | — | — | — | — | — | — |
| 25 | 436 | 42 | 85 | 203 | 42 | 90 | 440 | 45 | 87 | — | — | — | — | — | — |
| 30 | 529 | 38 | 83 | 251 | 35 | 90 | 575 | 45 | 87 | — | — | — | — | — | — |

$^a$In all tests, flocculant was 1 pound Armeen T plus 1 pound Arquad 2HT-75 per ton of black 11-37-0.

$^b$

| Liquid designation | Polyphosphate level % of total P$_2$O$_5$ | Grade | W.I. solids, % by wt. | Acid designation |
|---|---|---|---|---|
| CLP-3/1, 3/5, 3/7 | 70 | 11.4–36.9–0 | 0.2 | F-26 |

Table I-continued

| CL-12/19, 12/20 | 71 | 11.0–36.0–0 | 0.8 | 0-24 |
| B-29 | 77 | 11.2–36.9–0 | — | F-6 |

Chemical composition, % by wt.

| Acid designation | Total P₂O₅ | Ortho P₂O₅ | Fe₂O₃ | Al₂O₃ | F | MgO | CaO | W.I. solids |
|---|---|---|---|---|---|---|---|---|
| F-26 | 67.8 | 51.8 | 1.9 | 1.0 | 0.32 | 0.48 | 0.08 | 0.3 |
| 0-24 | 69.5 | 46.4 | 1.6 | 2.5 | 0.53 | 0.74 | 0.35 | 0.4 |
| F-6 | 67.0 | 61.2 | 1.5 | 0.57 | 0.29 | 0.37 | — | 0.2 |

$^c$See FIG. 1 for mixer description.
$^d$%T = % transmittance measured at 560 nanometers on a Bausch and Lomb Spectronic 20 colorimeter.

Referring now more specifically to FIG. 5, the effect on product quality of the average number of passes of liquid through the centrifugal pump is graphically illustrated. As would be expected, the quality of the liquid products varied somewhat from batch to batch and for a given degree of mixing. However, except in one case (4-gallon test with liquid B at 1-minute mixing time or 7 passes through the pump), the liquids all were of satisfactory quality (>35 percent light transmittance at 560 nanometers wavelength.

With liquids CLP and B, tests were made at both the 2- and 4-gallon levels in the mixer. With the exception of the first sample (15 passes through pump, 2-gallon level) taken in tests with liquid CLP, the liquids produced at the 2-gallon level were clearer, for a given number of passes through the pump, than those produced at the 4-gallon level. In these tests, it was observed that there was more mixing action in the mixing vessel at the lower liquid level. With one liquid (CLP), the optimum number of pump passes was about 10 in operation at the 4-gallon level and about 30 in operation at the 2-gallon level (FIG. 4). With additional pump passes, clarity decreased. With another liquid (B), the optimum number of pump passes was about 50, but the number was relatively noncritical over the range of about 20 to 100 passes. With the third liquid (CL), which was tested only at the 2-gallon level, the number of pump passes was not very critical over the relatively wide range of 10 to 260 pump passes. These results indicate that while these different liquids had different mixing requirements for optimum flocculation, products of satisfactory clarity were produced at a wide range of mixing conditions.

The amount of clarified 11–37–0 recovered was generally on the order of 90 percent regardless of the degree of mixing.

EXAMPLE V

Factors that may be important to the mixing vessel design are degree of mixing in the vessel, retention time in the vessel, the points of addition of flocculant and 11–37–0, and points of withdrawal of mixed material and recycle material. Studies were therefore made of these factors to determine which factors were most important in obtaining the highest recovery of well-clarified phosphatic fertilizer solution.

The mixing apparatus (FIG. 4 supra) used in the initial test was the same as that used in studies reported above.

Referring now more specifically to FIGS. 6, 7, and 8, detailed descriptions of the other various configurations of the mixing system used in tests with one batch of liquid fertilizer are shown. As can be seen, the level of liquid in the mixer reservoir as well as the point of addition of the 11–37–0 and flocculants were varied.

In making the tests, aged black 11–37–0 liquid was heated to 180°F and fed continuously to the mixer reservoir recirculation line, generally at a rate of 600 pounds per hour. At this rate, the liquid circulated through the pump for 36 passes. The flocculants were also added to the mixer reservoir or to the recirculation line. The pump was operated at a constant recirculation rate of about 30 gallons per minute in all tests. Samples discharged from the mixer reservoir were stored in 500-milliliter graduates in a 170°F oven. After 1 hour of quiescent storage in the oven, the amount of clarified 11–37–0 present and the clarity of the clarified liquid were measured.

Data from these tests are shown in FIGS. 6, 7, and 8, supra. Also, detailed results of some of the tests are shown in the following tabulation.

| Test No. | Configuration | Mixer volume, gal. | Retention time, min. | Time, min. sample obtained after run started | Product recovery, % clear 11-37-0 | Product clarity, % light transmittance |
|---|---|---|---|---|---|---|
| I | A | 4 | 4.8 | 3 | 87 | 23 |
|   |   |   |   | 40 | 88 | 17 |
|   |   |   |   | 180 | 87 | 12 |
| IV | C | 2.9 | 3.5 | 3 | 87 | 50 |
|   |   |   |   | 14 | 80 | 43 |
|   |   |   |   | 31 | 72 | 41 |
| III | B | 2.6 | 3.1 | 3 | 87 | 43 |
|   |   |   |   | 9 | 87 | 43 |
|   |   |   |   | 12 | 88 | 43 |
| V | C | 1.9 | 2.3 | 7 | 86 | 47 |
|   |   |   |   | 14 | 87 | 47 |
| IX | F | 1.4 | 1.7 | 5 | 84 | 53 |
|   |   |   |   | 10 | 84 | 54 |
|   |   |   |   | 20 | 85 | 53 |

When the level in the mixing reservoir was maintained at 4 gallons in the previous work (configuration A) or at a level of 2.9 gallons (configuration C), results were poor; either product recovery or clarity decreased as operation was continued as shown in the above tabulation. When the level was at 1.4 to 2.6 gallons, product recovery was in the range of 84 to 87 percent and held at these values as the tests continued (12–20 minutes total operating time). The reasons for the poor results at the higher liquid level likely resulted from the poorer mixing observed in the mixer or from short-circuiting of the liquid in the mixer reservoir.

In the tests at the 2.6-gallon liquid level, the clarity of the product liquid was improved significantly (43 percent vs. 26 percent light transmittance) merely by introducing the flocculant into the recirculation line after the pump instead of directly to the mixer reservoir (compare tests II and III, FIGS. 6 and 7 supra). Further improvements in clairty to about 50–54 percent light transmittance occurred when the volume of liquid in the mixing reservoir was reduced form 2.6 to 1.4 gallons and the recirculation line discharge was submerged slightly below the liquid surface, as shown in tests VI, VII, VIII, and IX versus test III.

The best point of flocculant addition was in the recirculation line and there was no significant difference between addition upstream or downstream of the pump. The best point of addition of the black 11-37-0 was not definitely established in the first series of tests and further tests next were made with mixer configuration C (11–37–0 to mixer reservoir) and F (11–37–0 to recirculation line) to obtain information on this point. A mixer volume of 1.4 gallons was used in these tests. Several batches of aged liquids were used. These data are shown in Table II, infra, along with results of the earlier described tests with these mixer configurations and liquid batch B-30. Most of these tests also were made with a black 11-37-0 input feed rate of 600 pounds per hour, but a few tests were made also at a feed rate of 300 pounds per hour. Addition of the 11-3-7-0 to the recirculation line (configuration F) gave clearer liquids (about 5 percentage points higher in percent light transmittance). In one test, about 2 percentage points less clarified liquid was recovered; however, in the remaining tests, the amount of clarified liquid recovered was equal, regardless of whether the aged 11-37-0 was added to either the mixer reservoir or recirculation line. The differences in results between these two mixing systems were not deemed significant.

An additional test made with mixer configuration C at a 1.4-gallon level indicated that the mixing apparatus throughput could be increased to 1,150 pounds per hour [equivalent to separator feed rate of 600 lb/(hr)(ft$^2$)] with continued good clarification. In this test, the liquid circulated through the pump for 18 passes. A product recovery of 87 to 88 percent was obtained. Liquid of satisfactory clarity was obtained.

Table II

| Black 11-37-0 designation[b] | Operation of Pilot-Plant Mixer[a] | | | |
|---|---|---|---|---|
| | Mixer configuration C | | Mixer configuration F | |
| | Product recovery, % clear 11-37-0 | Product clarity, % transmittance | Product recovery, % clear 11-37-0 | Product clarity, % transmittance |
| 300 Pounds per Hour of Black 11-37-0 (72 Passes Through Mixing Pump) | | | | |
| B-37, 42 | 89–90 | 43–41 | 89–90 | 48 |
| B-37 | — | — | 86–88 | 49–52 |
| B-42 | — | — | 88–90 | 45–52 |
| 600 Pounds per Hour of Black 11-37-0 (36 Passes Through Mixing Pump) | | | | |
| B-30 | 86–87 | 47–49 | 84–85 | 53–54 |
| B-37, 42 | 89 | 33–36 | 89 | 41 |
| B-31 | 87–88 | 44–47 | — | — |
| B-32 | — | — | 88 | 58–62 |

[a]The black 11-37-0 liquids were heated to 170°–180°F and fed continuously to the 1.4-gallon mixer vessel or recirculation line. The flocculants were heated to 140°F and fed to the recirculation line. Samples removed from the mixer were stored in graduates in a 170°F oven for 1 hour and then evaluated.

[b]Composition of liquids:

| Liquid designation | Polyphosphate level, % of total P$_2$O$_5$ | Grade |
|---|---|---|
| B-29 | 74 | 11.0–36.7–0 |
| B-30 | 77 | 11.3–37.2–0 |
| B-31 | 68 | 11.4–37.1–0 |
| B-32 | 78 | 11.5–37.6–0 |
| B-37 | 74 | 11.3–37.7–0 |
| B-42 | 75 | 11.4–37.5–0 |
| B-37, 42 | 72 | 11.5–37.6–O |

EXAMPLE VI

This example is illustrative of the use of the combination of the aliphatic amine and quaternary ammonium chloride flocculants (Armeen T and Arquad 2HT-75) in the continuous-type process described in FIG. 1 supra.

This test was made in pilot-plant equipment which consisted essentially of a pipe reactor and a liquid fertilizer reactor for preparation of black 11–37–0, a mixer with recirculation pump for mixing flocculant with the 11–37–0, and a settling vessel (separator) for separation of the flocculated black material from clear 11–37–0. The process was carried out essentially as pictured in the flowsheet FIG. 1, supra.

In the production of liquid fertilizer, black wet-process superphosphoric acid[1] was heated to 200°F and then fed to the pipe reactor along with sufficient ammonia to give a final liquid pH of about 6. The pipe reactor was constructed of ¼- or ¾-inch pipe in the shape of an inverted U; it was 36 inches in length. The molten ammonium polyphosphate produced in the pipe discharged into the side of a cylindrical (12-inch-diameter by 24-inch high) liquid fertilizer reactor beneath the liquid surface. Sufficient water was added to the reactor to give a liquid with a density of about 1.4 grams per milliliter which corresponds to a grade of 11-37-0. The liquid in the reactor was maintained at 180° to 190°F by circulating water through cooling coils located in the reactor. Maximum pipe temperatures were in the range of 600° to 620°F and the product liquids contained 11 percent N and 36 to 38 percent $P_2O_5$ with 70 to 78 percent of the $P_2O_5$ as polyphosphate. Liquid production rates were in the range of 91 to 208 pounds per hour. Acid produced by Company "A."

The black 11-37-0 flowed from the liquid fertilizer reactor to the mixer where the flocculants and liquid were combined. The mixer was the 8-inch-diameter by 24-inch-high vessel; liquid was withdrawn from the bottom, through an open-impeller centrifugal pump and recirculated. The retention time in the mixer was 5 to 15 minutes and the flow rate through the pump was 30 gallons per minute. (This pumping rate was measured in calibration tests with water, but the flow rate of liquid with viscosity of the 11-37-0 should not be significantly different based on correction factors given in the literature.[1]) The mixtures passed through the pump about 100 to 230 times. The flocculants, and aliphatic amine and a quaternary ammonium chloride, were weighed and melted (140°F); then batches of the proper proportions were stored in a heated glass vessel and fed by a metering pump to the mixing vessel where they discharged on the liquid surface. Either a 1:1 or 3:1 weight ratio of aliphatic amine to quaternary ammonium chloride was used. From 1.2 to 2.0 pounds of the aliphatic amine (0.06-0.1 percent by weight) was added per ton of black 11-37-0. Total amount of flocculants used was 2.1 to 2.6 pounds per ton of black 11-37-0.

Clarke, Loyal, and Davidson, R. Manual for Process Engineering Calculations, 2nd ed., McGraw Hill, New York, New York (1962).

The mixtures of 11-37-0 and flocculant (170°-180°F) overflowed by gravity from the mixer to a cylindrical separator (19-inch-diameter by 27-inch-high) with a cone-shaped bottom. Retention times used were 35, 60, and 75 minutes. The temperature of the liquid in the separator was 165° to 170°F. Feed rates to the separator were equivalent to 46 to 107 pounds per hour per square foot of separator cross section. The clarified liquid was pumped from the bottom of the separator at controlled rates through a heat exchanger where it was cooled to about 100°F before it went to a collection vessel. The black "tops" portion was moved to the center of the separator by an S shaped scraper blade and was discharged through a 2-inch "standpipe." The tops then were pumped through a heat exchanger where they were cooled to 125°F or less and then to a collection vessel.

In these tests (tables III and IV infra), the depth of tops in the settler remained constant at about 2-½ to 3 inches while withdrawing clarified 11-37-0 at rates equivalent to 88-95 percent of the feed 11-37-0. The proportion of clarified liquid obtained was controlled by adjusting the rate at which the clarified 11-37-0 was pumped from the separator.

Clear green liquid fertilizers with acceptable clarity (>50 percent light transmittance at 560-nanometer wavelength) and with essentially no carbonaceous matter present were obtained in all tests. Analyses of the tops and clarified product were essentially the same (10-11 percent; 36-38 percent $P_2O_5$). From 97 to 99 percent of the water-insoluble solids, presumed to be principally carbonaceous material, were present in the tops. After about 4 weeks of storage at room temperature, the clarified products contained only minor amounts of carbonaceous matter floating on the surfaces of the liquids. This material could be dispersed easily.

Table III

Production of Black 11-37-0 Liquid Fertilizer by the Pipe-Reactor Process

| Test No., CLP- | 2/15 | 3/5 | 3/7 |
|---|---|---|---|
| Length of test, hr | 6 | 6 | 6 |
| Pipe Reactor Designation[a] | A | B | B |
| Superphosphoric acid[b] fed | | | |
|   Rate, lb/hr | 52.1 | 111.4 | 113.0 |
|   Tons/(hr)(ft³ reactor volume) | 4.1 | 9.3 | 8.9 |
|   Temperature, °F | 200 | 200 | 200 |
| Anhydrous ammonia fed | | | |
|   Temperature, °F | 125 | 125 | 130 |
|   Rate, lb/hr | 12.7 | 27.5 | 28.3 |
| Temperature, °F | | | |
|   18 inches downstream from mixing tee | 600 | — | 610 |
|   25 inches downstream from mixing tee | 605 | 620 | 615 |
| Liquid Fertilizer Reactor[c] | | | |
|   Temperature, °F | 180 | 190 | 190 |
|   Retention time, min | 45 | 22 | 21 |
| $H_2O$ fed | | | |
|   Lb/hr | 27.4 | 67.7 | 71.2 |
|   Percent of feed $H_2O$ lost[d] | 5 | 4 | 6 |
| Reactor discharge | | | |
|   Grade | 11.5-38.8-0 | 11.1-37.0-0 | 11.2-36.9-0 |
|   Water-insoluble solids, % by wt. | 0.1 | 0.2 | 0.2 |
|   % of total $P_2O_5$ as polyphosphate | 70 | 78 | 76 |
|   Density, g/ml at 80°F | 1.453 | 1.440 | 1.432 |
|   Viscosity, cP at 80°F | 172 | 134 | 128 |
|   pH (undiluted) | 5.8 | 6.1 | 6.1 |
|   Rate, lb/hr (calculated from acid feed rate) | 91 | 204 | 208 |

[a] A = pipe reactor constructed in the shape of an inverted "U" of ½inch stainless steel pipe 36 inches in total length.
B = pipe reactor similar to A but constructed of ⅛inch stainless steel pipe.
[b] Source and composition of the feed acid is described below:

Table III-continued

| Designation | Source | Chemical composition, % by wt. | | | | | | | |
|---|---|---|---|---|---|---|---|---|---|
| | | Total $P_2O_5$ | Ortho $P_2O_5$ | $Fe_2O_3$ | $Al_2O_3$ | F | MgO | CaO | W.I. solids |
| F-26 | Company A | 67.8 | 51.8 | 1.9 | 1.0 | 0.32 | 0.43 | 0.08 | 0.3 |

*Tank-type reactor, 12-inch-diameter by 24-inch-high, with overflow 12 inches above bottom and equipped with a cooling coil and a 4-inch-diameter marine-type impeller. Operating capacity of 5.8 gallons with no agitation.
*dCalculated from water fed and analysis of product.

Table IV

Clarification of Black 11-37-0 in Pilot-Plant Equipment

| Test No., CLP-Mixer | 2/15 | | 3/5 | | 3/7 | |
|---|---|---|---|---|---|---|
| 11-37-0 feed | | | | | | |
| Rate (sum of separator discharge rates), lb.hr | 89 | | 179 | 182 | 208 | |
| Temperature, °F | 180 | | 190 | | 180 | |
| Flocculant | | | | | | |
| Designation | Armeen T | Arquad 2HT-75 | Armeen T | Arquad 2HT-75 | Armeen T | Arquad 2HT-75 |
| Rate, g/min of each | 0.4 | 0.4 | 1.36 | 0.45 | 1.30 | 0.43 |
| Rate, lb/ton fertilizer | 1.2 | 1.2 | 2.0 | 0.6 | 1.6 | 0.5 |
| Temperature, °F | | 140 | | 140 | | 140 |
| Operating conditions | | | | | | |
| Temperature, °F | 170 | | 180 | | 170 | |
| Retention time, min. | 15 | | 5 | 15 | 5 | |
| Recirculation pump$^a$ rated capacity, gal/min | 30 | | | 30 | | 30 |
| Number of passes through pump$^b$ | 236 | | 117 | 115 | 101 | |
| Discharge composition | | | | | | |
| Grade | 10.7-37.4-0 | | 11.4-37-.7-0 | 11.4-37-.5-0 | 11.4-37.3-0 | |
| Water-insoluble solids, % by wt. | 0.3 | | 0.3 | 0.4 | 0.5 | |
| % of total $P_2O_5$ as polyphosphate | 66 | | 76 | 76 | 76 | |
| Separation Vessel$^c$ | | | | | | |
| Operating conditions | | | | | | |
| Scraper blade, rpm | 3.5 | | 3 | | 3.5 | |
| Retention time, min. | 75 | | 60 | | 35 | |
| Feed rate, lb/(hr)(ft$^2$) | 46 | | 92 | 93 | 107 | |
| Temperature, °F | | | | | | |
| Inlet | 170 | | 170 | | — | |
| Middle | 165 | | 170 | | — | |
| Discharge | 165 | | 170 | | 170 | |
| Total liquid height, in | 13 | | 19 | 19 | 14 | |
| Carbonaceous material depth, inches, at end of test period | 2.5-3.0 | | 2.5-3.0 | 2.5-3.0 | 2.5-3.0 | |
| Overflow ("tops" containing carbonaceous material | | | | | | |
| Discharge rate, lb/hr | 9 | | 9 | 22 | 23 | |
| Temperature, °F | — | | 90 | 90 | 125 | |
| Composition | | | | | | |
| Grade | 10.6-37.0-0 | | 11.5-38-.1-0 | 11.0-36.4-0 | 1.2-37-.0-0 | |
| W.I. solids, % by wt. | 2.7 | | 2.3 | 2.2 | 3.1 | |
| MgO, % by wt. | — | | 0.26 | 0.26 | — | |
| % of total $P_2O_5$ as polyphosphate | 65 | | 75 | 76 | 75 | |
| Density, g/ml at 80°F | 1.301 | | 1.291 | 1.299 | 1.312 | |
| Viscosity, cP$^d$ at 80°F | 570 | | 640 | 410 | 970 | |
| Underflow (clarified "product" liquid) | | | | | | |
| Discharge rate, lb/hr | 80 | | 170 | 160 | 185 | |
| Recovery of 11-37-0, % of input | 90 | | 95 | 88 | 39 | |
| Temperature, °F | — | | 90 | 90 | 100 | |
| Clarity, % transmittance$^e$ | 56 | | 50 | 56 | 50 | |
| Composition | | | | | | |
| Grade | 10.7-37.5-0 | | 11.3-37-.7-0 | 11.5-37.8-0 | 1.4-37-.4-0 | |
| W.I. solids, % by wt. | 0.009 | | 0.002 | 0.002 | 0.010 | |
| MgO, % by wt. | — | | 0.26 | 0.26 | — | |
| % of total $P_2O_5$ as polyphosphate | 65 | | 71 | 70 | 73 | |
| Density, g/ml at 80°F | 1.444 | | 1.440 | 1.447 | 1.446 | |
| Viscosity, cP$^d$ at 80°F | — | | 140 | — | 136 | |
| pH (undiluted) | 5.6 | | 5.9 | 6.0 | 6.1 | |

$^a$Closed impeller centrifugal pump, 1725 rpm, model MFP, Memphis Pump and Manufacturing Co., Inc., Memphis, Tennessee. Rate expressed in gal/min of water.
$^b$Calculated from pump capacity and feed rate to mixer.
$^c$Vessel, 19-in-dia. by 27-in-high, with cone-shaped bottom, 8-in-high; 2-in.-dia. standpipe in center of vessel for removing tops and side discharge on cone to remove clarified liquid fertilizer. An "S" shaped sweeper, 16-in-dia., moved tops to center of vessel. Maximum capacity of vessel (no agitation) is 35 gallons.
$^d$Apparent viscosities determined with Brookfield Synchro-Lectric viscometer model RVT, operating at 100 rpm, spindle No. 2 or 3.
$^e$Percent transmittance determined with Bausch and Lomb Spectronic 20 colorimeter, wavelength set at 560 n, equipped with ½inch test tube; distilled water used as 100 percent transmittance standard.

EXAMPLE VII

Tests were also made to study the effect of grade of the black liquid fertilizer on clarification. A black liquid fertilizer of 11.7–37.1–0 grade containing 59 percent polyphosphate was diluted with water to various concentrations and then clarified by the procedure described in Example I supra. Results of these tests are shown below.

| Test No., CL- | Black liquid designation | Lb flocculant/ton 11-37-0 | | Liquid grade | % recovery of clarified 11-37-0 after | | % transmittance through clarified liquid after 60 min |
|---|---|---|---|---|---|---|---|
| | | Aliphatic amine | Quaternary ammonium chloride | | 30 min | 60 min | |
| 296 | 1040 (undiluted) | 1 | 1 | 11.1–37.1–0 | 84 | 87 | 69 |
| 297 | 1040 (diluted) | 1 | 1 | 10.3–34.2–0 | 87 | 91 | 67 |
| 298 | 1040 (diluted) | 1 | 1 | 8.6–27.2–0 | 94 | 96 | 60 |

These tests show that liquids of lower grades than 11–37–0 can be clarified satisfactorily without changing either the amount or type of flocculants or the flocculating procedure.

While we have shown and described particular embodiments of our invention, modifications and variations thereof will occur to those skilled in the art. We wish it to be understood therefore that the appended claims are intended to cover such modifications and variations which are within the true scope and spirit of our invention.

What we claim as new and desire to secure by letters patent of the United States is:

1. An improved process for the removal of carbonaceous matter from ammoniated polyphosphate solutions wherein:
   said solutions have a pH above about 4.5;
   said solutions are prepared by the molecular dehydration and subsequent or concurrent ammoniation of wet-process phosphoric acid containing about 50 to 72 percent $P_2O_5$;
   said carbonaceous matter results from organic impurities in said wet-process phosphoric acid;
   said carbonaceous matter chars during the molecular dehydration of said wet-process orthophosphoric acid to superphosphoric acid, the improvement therein for removing substantially all of the black particualte carbonaceous matter therein by flocculation and subsequent flotation thereby eliminating any requirement for filtering means therein;
   which improved process comprises the steps of adding to the solution from about 0.015 to about 0.075 percent by weight of a water-insoluble primary amine having a lower density than the ammoniated polyphosphate solution and immiscible therewith; adding to the solution from about 0.005 to about 0.075 percent by weight of a water-insoluble quaternary ammonium chloride having a lower density than the ammoniated polyphosphate solution and immiscible therewith; agitating the resulting mixture to bring said amine and said quaternary into intimate contact with said solution; holding the solution until the solids flocculate and float to the surface; and separating the resulting flocculated solids from the underflow.

2. The process of claim 11 in which said ammoniated polyphosphate solution has a pH range from about 5.5 to about 6.5 and contains from about 50 to about 90 percent by weight of the total $P_2O_5$ as nonorthophosphate.

3. The process of claim 1 in which said primary amine has alkyl groups with hydrocarbons with chain lengths of about 12 to about 20 carbon atoms and in which said quaternary is a dialkyl dimethyl ammonium chloride having hydrocarbons with chain lengths of about 16 to about 18 carbon atoms.

4. The process of claim 1 in which said ammonium polyphosphate solution ranges from about 8–27–0 to about 11–37–0.

5. The process of claim 1 wherein the agitation of the mixture is equivalent to that provided by from about 20 to about 250 passes through a closed impeller centrifugal pump.

6. An improved process for the removal of carbonaceous matter from ammoniated polyphosphate solutions wherein;
   said solutions have a pH above about 4.5;
   said solutions are prepared by the molecular dehydration and subsequent or concurrent ammoniation of wet-process phosphoric acid containing about 50 to 72 percent $P_2O_5$;
   said carbonaceous matter results from organic impurities in said wetprocess phosphoric acid;
   said carbonaceous matter chars during the molecular dehydration of said wet-process orthophosphoric acid to superphosphoric acid, the improvement therein for removing substantially all of the black particulate carbonaceous matter therein by flocculation and subsequent flotation thereby eliminating any requirement for filtering means therein;
   which improved process comprises the steps of adding to the solution from about 0.015 to about 0.075 percent by weight of a water-insoluble acetic acid salt of a primary amine having a lower density that the ammoniated polyphosphate solution and immiscible therewith; adding to the solution from about 0.005 to about 0.075 percent by weight of a water-insoluble quaternary ammonium chloride having a lower density than the ammoniated polyphosphate solution and immiscible therewith; agitating the resulting mixture to bring said amine and said quaternary into intimate contact with said solution; holding the solution until the solids flocculate and float to the surface; and separating the resulting flocculated solids from the underflow.

7. The process of claim 6 in which said ammoniated polyphosphate solution has a pH range from about 5.5 to about 6.5 and contains from about 50 to about 90 percent by weight of the total $P_2O_5$ as nonorthophosphate.

8. The process of claim 6 in which said acetic acid salt of a primary amine has alkyl groups with hydrocarbons with chain lengths of about 12 to about 18 carbon atoms and in which said quaternary is a dialkyl dimethyl ammonium chloride having hydrocarbons with chain lengths of about 16 to about 18 carbon atoms.

9. The process of claim 6 in which said ammonium polyphosphate solution ranges from about 8–27–0 to about 11–37–0.

10. The process of claim 6 wherein the agitation of the mixture is equivalent to that provided by from about 20 to about 250 passes through a closed impeller centrifugal pump.

* * * * *

UNITED STATES PATENT AND TRADEMARK OFFICE
CERTIFICATE OF CORRECTION

PATENT NO. : 3,969,483
DATED : July 13, 1976
INVENTOR(S) : John M. Stinson, Horace C. Mann, Jr., and Dale H. Johnson It is certified that error appears in the above-identified patent and that said Letters Patent are hereby corrected as shown below:

Column 7, line 6, change "te" to -- the --
Column 13, line 18, after "each" change "of" to -- or --
Column 18, line 61, change "¼" to -- ½ --
Column 19, lines 8 and 9, "Acid produced by Company A" should be a footnote.
Column 20, table III, third line of footnote a, change "1/3 inch"
        to -- 3/4-inch --
Columns 21 and 22, table IV, make the following changes:

Beginning at about the bottom half of the table, starting with "23" opposite "discharge rate" move the rest of the column to the right so that it is vertically beneath the heading "3/7" (last column).

Move the column just to the left of the one mentioned supra, beginning with "22" opposite "discharge rate" to the right so that it is vertically beneath the heading near the top of the table "182."

In the same bottom half of the table, horizontally opposite "Grade," (last two columns) the grades should be -- 11.0-36.4-0 and 11.2-37.0-0 -- respectively.
Likewise opposite "Grade" near the bottom of the table (last two columns), the grades should be -- 11.5-37.8-0 and 11.4-37.4-0 -- respectively.

Column 23, claim 2, after "claim" change "11" to -- 1 --

Signed and Sealed this

Twenty-first Day of September 1976

[SEAL]

Attest:

RUTH C. MASON
*Attesting Officer*

C. MARSHALL DANN
*Commissioner of Patents and Trademarks*